(12) United States Patent
Larkin et al.

(10) Patent No.: US 6,268,946 B1
(45) Date of Patent: Jul. 31, 2001

(54) APPARATUS FOR COMMUNICATING DIVERSITY SIGNALS OVER A TRANSMISSION MEDIUM

(75) Inventors: Robert S. Larkin, Corvallis; Qiang Wu, Portland; Robert L. Farris, Corvallis, all of OR (US)

(73) Assignee: Radio Frequency Systems, Inc., Meriden, CT (US)

( * ) Notice: Subject to any disclaimer, the term of this patent is extended or adjusted under 35 U.S.C. 154(b) by 0 days.

(21) Appl. No.: 09/108,627

(22) Filed: Jul. 1, 1998

(51) Int. Cl.[7] .................................................. H04B 10/12
(52) U.S. Cl. ..................... 359/173; 359/152; 359/189; 359/180; 455/103; 455/93; 455/202; 455/303; 375/219; 375/259
(58) Field of Search ..................................... 375/219, 259, 375/272, 303, 334; 455/103, 93, 102, 118, 105, 67.1, 162; 359/173, 152, 180, 189, 219, 259

(56) References Cited

U.S. PATENT DOCUMENTS

| | | | | |
|---|---|---|---|---|
| 3,860,873 | * | 1/1975 | Ringstad | 325/3 |
| 4,225,751 | * | 9/1980 | Hershberger | 179/1 |
| 4,289,373 | * | 9/1981 | Sugimoto et al. | 350/96 |
| 4,323,731 | * | 4/1982 | Hershberger | 179/1 |
| 5,067,173 | * | 11/1991 | Gordon et al. | 359/152 |
| 5,457,811 | * | 10/1995 | Lemson | 455/67.1 |
| 5,752,180 | * | 5/1998 | Guo et al. | 455/319 |
| 6,018,514 | * | 1/2000 | Bickham et al. | 370/217 |
| 6,075,823 | * | 6/2000 | Sonoda | 375/267 |

* cited by examiner

Primary Examiner—Leslie Pascal
Assistant Examiner—Chau M. Nguyen
(74) Attorney, Agent, or Firm—Ware, Fressola, Van Der Sluys & Adolphson LLP

(57) ABSTRACT

An apparatus for communicating, over a single transmission medium, two signals of substantially the same center frequency. The apparatus offsets in frequency one of the signals by combining the signal with the signal from a local oscillator. The apparatus then transmits the two signals, one offset from the other, as well as the signal from the local oscillator to allow for recovery of the two signals with a precise correction for the offset. In particular, the transmission medium is an optical fiber and the two signals are a main RF signal and a diversity RF signal received, respectively, by a main element and a diversity element of a diversity antenna system. The invention is of use, for example, in providing to a microbase station a main RF signal and its diversity RF signal received at a diversity antenna system remote from the microbase station and connected to the microbase station by an optical fiber.

8 Claims, 2 Drawing Sheets

APPARATUS FOR COMMUNICATING DIVERSITY SIGNALS OVER A TRANSMISSION MEDIUM

FIELD OF THE INVENTION

The present invention pertains to simultaneously transmitting multiple signals, and in particular, to transmitting multiple signals at substantially the same center frequency over a single transmission medium.

BACKGROUND OF THE INVENTION

In some communications applications, it is desirable to receive a main signal and its diversity signal and to communicate both signals to a second location where one or the other signal is selected as the preferred signal for reception. In some applications it is desirable that the communication to the second location use an optical fiber as the communications medium.

For example, a microbase station in a cellular communication system might use a diversity antenna system located anywhere from several meters to several hundred meters away from the microbase station. The diversity antenna system would include an antenna element for receiving a main RF signal and another element for receiving a diversity RF signal corresponding to the main signal. The two RF signals would have the same center frequency. The two signals could be provided by, for example, a polarization diversity antenna system in which a horizontally polarized and a vertically polarized signal are both received and provided to the microbase station. The two signals could also be provided by a spatial diversity antenna system, located away from a microbase station, in which two antennas are physically separated, each receiving a signal traveling from the source by a different path, and both signals are to be provided to the microbase station.

With the diversity antenna system removed from the microbase station where the receiver components are located that select either the main signal or the diversity signal, both RF signals must be transmitted from the remote antenna system to the microbase station. It is often desirable to do this using optical fiber as the transmission medium; this of course requires that the RF signals modulate an optical carrier signal.

In propagating within the optical fiber, the main signal and diversity signal of either a spatial diversity antenna system or a polarization diversity antenna system are essentially indistinguishable, because the two signals have the same center frequency and the features that provide diveristy for propagation in air, polarization or path taken, are not available within the optical fiber. Therefore, measures must be taken to keep the two signals distinct. One way to keep the signals distinct is to shift one or both signals in RF frequency before modulating the optical carrier. Then after demodulating the optical carrier, the shifted RF signal or signals are converted back to their original RF frequency. In doing this back conversion, however, the back-converted signal is often distorted.

What is needed is a way to transmit a main signal and its diversity signal, at essentially the same center frequency as the main signal, along a single optical fiber in a way that does not cause distortion, and can be implemented without unduly complex hardware.

SUMMARY OF THE INVENTION

The present invention has as an object transmitting over a single optical fiber leading to a target destination, two RF signals $f_1$ and $f_1'$ at a same center frequency $f_1$, and recovering the two RF signals at the target destination so that the signals are provided reasonably free of distortion. It is a further object of the present invention to provide this reasonably distortion free communication using relatively little hardware.

The present invention achieves these objects by an apparatus that shifts in frequency one or both of the two RF signals $f_1$ and $f_1'$ by mixing one or both of the signals with a signal $f_{LO}$ provided by a local oscillator, and, by modulating an optical carrier, transmitting along the optical fiber not merely the two RF signals $f_1$ and $f_1'$, one shifted in frequency, but also the signal $f_{LO}$ provided by the local oscillator. Then, at the other end of the optical fiber, the optical carrier is demodulated and the result provided to three filters each tuned to a different one of the three frequencies of the signals transmitted on the optical fiber. One of these three filters extracts the signal $f_{LO}$ provided by the local oscillator. The extracted signal $f_{LO}$ is then used to down-convert, by mixing and filtering, the one or more frequency-shifted RF signals.

Thus, frequency errors are avoided because the receiving end filters provide, precisely, the same local oscillator signal used to shift the frequency of one or both of the two original RF signals $f_1$ and $f_1'$.

If by mixing with the local oscillator signal, one of the original RF signals is down-shifted in frequency, instead of shifted up in frequency, subsequent filtering of the down-shifted shifted signal by a narrow band filter, such as a surface acoustic wave (SAW) filter, can be more selective because of filtering at a lower frequency.

The present invention is not restricted to transmitting only two same center frequency signals along a single optical fiber. The present invention can also be used to transmit multiple signals on different frequencies. For example, if the second signal is on frequency $f_2$ along with a corresponding diversity signal $f_2'$, hardware can be provided including a second oscillator so that instead of multiplexing three signals, six signals will be multiplexed onto the optical fiber. At the receiving end of the optical fiber, instead of three filters, six filters would be provided to separate the signals.

The transmission medium need not be an optical fiber. The present invention instead could be used in communicating with a target destination by a radio link, coaxial cable, or other media suitable for handling RF signals.

In addition, the present invention can be used so that after mixing one of the two RF signals with the signal from a local oscillator frequency $f_{LO}$, the signal at a frequency of $f_1+f_{LO}$ is selected, instead of the down-shifted signal, $f_1-f_{LO}$. Moreover, the present invention can be used in support of a triversity antenna system by selecting both an upshifted signal and a downshifted signal after mixing two of three triversity signals with the signal from a local oscillator.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION AND THE PREFERRED EMBODIMENT

Figure 1:
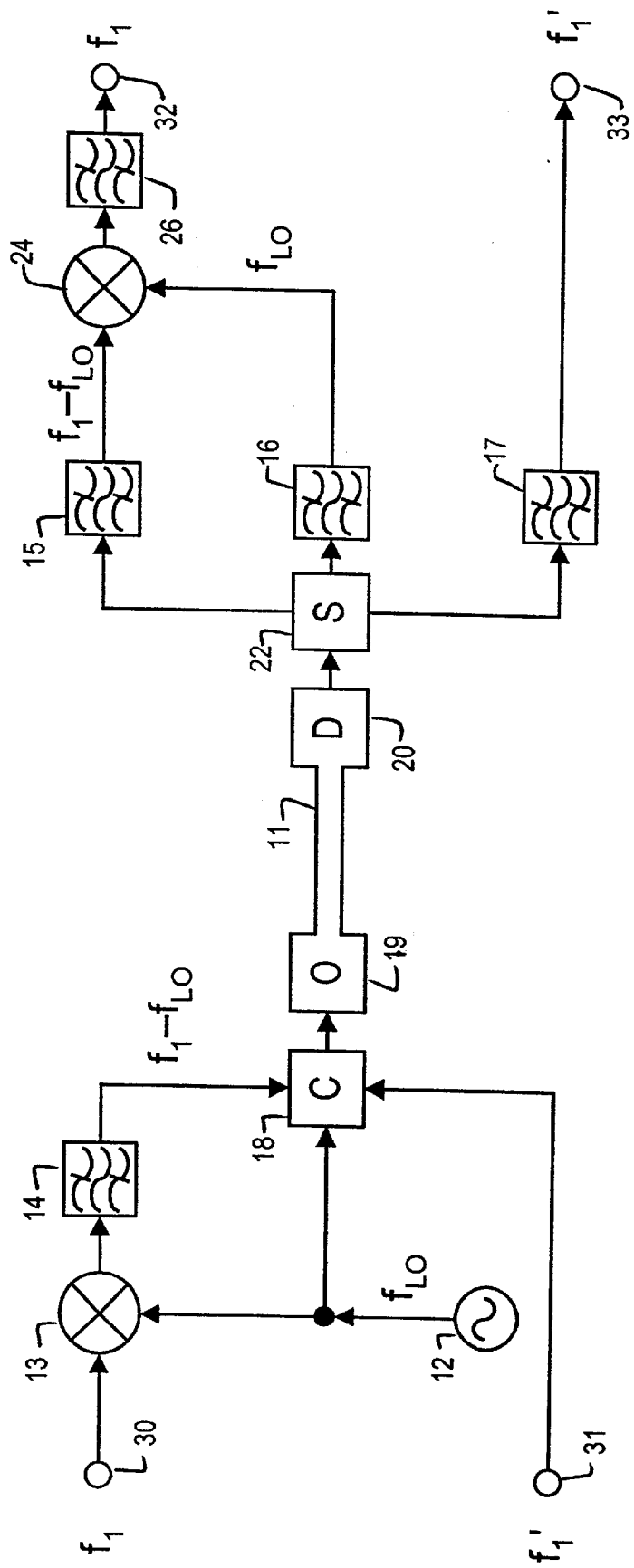
FIG. 1 is a block diagram showing the essential components needed for the present invention.

Referring now to FIG. 1, an apparatus according to the present invention is shown receiving at inputs 30 and 31, respectively, a main signal $f_1$ and its diversity signal $f_1'$, both at substantially the same center frequency $f_1$. Signal $f_1$ is input to a mixer 13 where it is combined with a signal $f_{LO}$ from a local oscillator 12, operating at a frequency $f_{LO}$. The output of the mixer 13 is passed to a bandpass filter 14, which selects out signals at the frequency $f_1-f_{LO}$ and passes the signal represented by $f_1-f_{LO}$ to a combiner 18. The combiner 18 is also provided as input the signal $f_{LO}$ from the local oscillator 12, and signal $f_1'$, the diversity RF signal, directly from input 31. The combiner 18 additively combines the three signals $f_1'$, $f_{LO}$, and $f_1-f_{LO}$. In the preferred embodiment the combiner 18 is a frequency selective combiner.

The combiner 18 provides its output to an optical transmitter 19, which uses the combiner output to modulate an optical carrier and feed the resulting light signal to an optical fiber 11. At the other end of the optical fiber 11, a photodetector 20 demodulates the light signal to produce an RF signal corresponding to the output of the combiner 18. This combined RF signal is fed to a splitter 22. The splitter 22 provides the combined RF signal to each of three tuned filters 15, 16, and 17. Bandpass filter 15 is tuned to pass the signal $f_1-f_{LO}$; filter 16 is tuned to pass the signal $f_{LO}$; and filter 17 is tuned to pass the signal $f_1'$, which is provided at output 33.

The outputs of bandpass filters 15 and 16 are provided to mixer 24, which produces as one output the signal $f_1$ (at frequency $f_1$). The output of the mixer 24 is fed to bandpass filter 26, which selects out the signal $f_1$ and provides the signal $f_1$ at output 32. Thus, because the signal $f_{LO}$ is provided to mixer 24, mixer 24 can perform, in effect, a precise upconverting by the frequency $f_{LO}$ of the signal $f_1-f_{LO}$. In other words, because in the present invention not only are the two signals $f_1$ and $f_1'$ transmitted along the optical fiber, one offset from the other in frequency, but so also is the offset, allowing the present invention to achieve the object of providing a main signal and its diversity signal relatively free of distortion.

Figure 2:
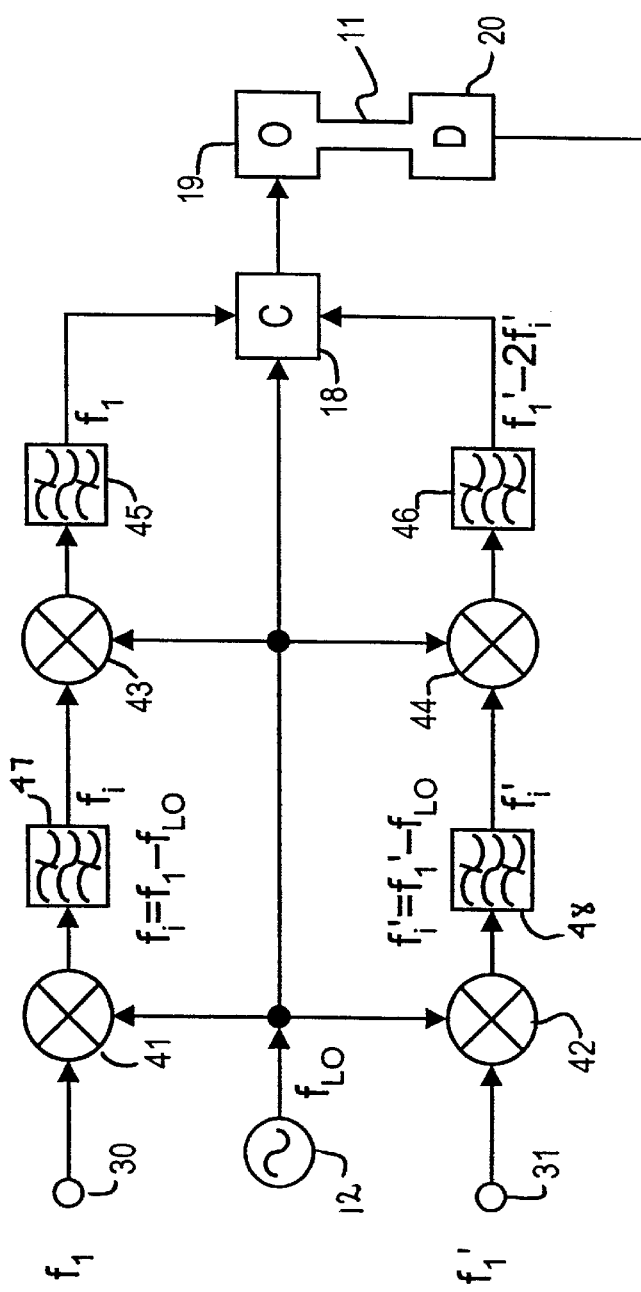
FIG. 2 is a block diagram showing the preferred embodiment of the present invention.
Figure 2:
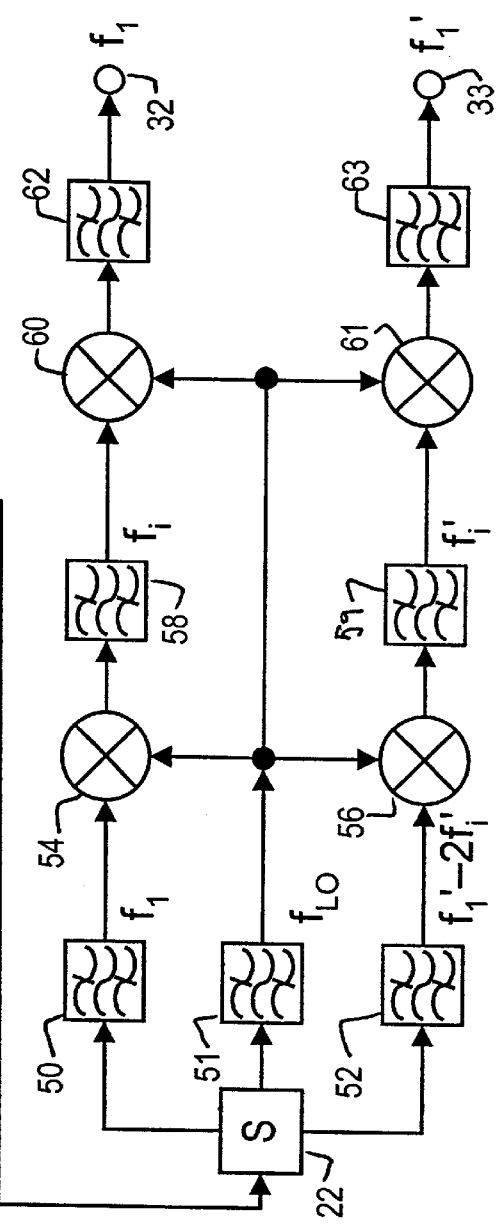

Referring now to FIG. 2, the present invention is shown in the preferred embodiment. Here, the offset is different than the offset $f_{LO}$ demonstrated in FIG. 1. Here, both input signals $f_1$ and $f_1'$, provided at inputs 30 and 31 respectively, and at substantially the same center frequency $f_1$, are downconverted to a common intermediate frequency $f_i=f_1-f_{LO}$ by mixers 41 and 42, respectively. After filtering with bandpass filters 47 and 48 tuned to this same intermediate frequency $f_i$, mixer 43 and filter 45, in combination, recover signal $f_1$, which is then passed to the combiner 18 as in FIG. 1. However, the diversity signal $f_1'$ is handled differently.

Mixer 44 provides essentially the same outputs involving the diversity signal as mixer 43 provides for the main signal, but filter 46 is tuned not to the frequency of the diversity signal ($f_1$), but instead to the frequency $f_{LO}-f_i=f_1-2f_i$ (where the frequency $f_i=f_1-f_{LO}$). By selecting the frequency $f_{LO}$ of the local oscillator to be less than, but nearly equal to the frequency of the received RF signals $f_1$ and $f_1'$, the intermediate frequency $f_i$ is made small. Thus, the main signal $f_1$, provided through filter 45, is close in frequency to the signal $f_1'-2f_i$, provided through filter 46 and conveying the information contained within the diversity signal $f_1'$. However, the frequency $f_1$ and the frequency of the signal $f_1'-2f_i$ should be made to be far enough apart so as to be easily filtered with RF filters, which are usually relatively low cost.

As in FIG. 1, the combiner 18 combines the three signals $f_1$, $f_{LO}$, and $f_1'-2f_i$ and provides the combined signal to the optical transmitter 19, which converts the RF signal to a light signal and feeds to the optical fiber 11. Also as in FIG. 1, at the other end of the optical fiber 11, a photodetector 20 demodulates the light signal to produce an RF signal corresponding to the output of the combiner 18. This combined RF signal is fed to the splitter 22. The splitter 22 provides the combined RF signal to each of three tuned filters 50, 51, and 52. Bandpass filter 50 is tuned to pass the signal $f_1$; filter 51 is tuned to pass the signal $f_{LO}$; and filter 52 is tuned to pass the signal $f_1'-2f_i'$.

The output $f_1$ of filter 50 is provided to mixer 54, which combines the $f_1$ signal with the signal $f_{LO}$, producing an output that is then filtered by a filter 58, tuned to the intermediate frequency $f_i=f_1-f_{LO}$ to extract the signal $f_i$. The signal $f_i$ is then provided to a mixer 60, which combines $f_i$ with the signal $f_{LO}$, provided by the filter 51, to provide an output with a frequency component at $f_1$. That component is extracted by providing the output of the mixer 60 to filter 46, tuned to frequency $f_1$. The extracted signal $f_1$ is provided at output 32.

The same series of operations is carried out for the diversity signal imbedded in the signal $f_1'-2f_i$ provided to mixer 56 along with signal $f_{LO}$. The output of mixer 56 is provided to filter 59, which is tuned to frequency $f_i=f_1-f_{LO}$ to produce the signal $f_i'$. The signal $f_i'$ in turn is provided to the mixer 61 along with signal $f_{LO}$. The output of mixer 61 is then provided to filter 63 tuned to frequency $f_1$ to provide the diversity signal $f_1'$.

Thus, in the preferred embodiment, the hardware for treating the main signal $f_1$ is identical to the hardware for treating the diversity signal $f_1'$ with the exception that the two filters 46 and 52 for treating the diversity signal are tuned to lower frequencies than the corresponding filters 45 and 50 for treating the main signal. All other equipment is the same.

Instead of a bandpass RF filter for extracting the local oscillator signal $f_{LO}$ (filter 16 in FIG. 1, and filter 51 in FIG. 2), the local oscillator frequency can be generated by a phase-locked loop pre-steered to be near the frequency $f_{LO}$. Using a phase-locked loop in this context is known in the art.

It should also be noted that in general the signals $f_1$ and $f_1'$ can be different signals at the same center frequency. In other words, the present invention is of use in transmitting any two signals of the same center frequency, not just a main signal and its diversity signal. Also, small changes in the frequency $f_{LO}$ of the local oscillator do not degrade performance of an apparatus according to the present invention because the signal $f_{LO}$ is first subtracted to produce the intermediate frequency signal $f_1-f_{LO}$ and then added back to produce the original main signal $f_1$.

FIG. 1 and FIG. 2 provide only the elements essential to practice the present invention. In a full implementation, an apparatus according to the present invention would include additional components, such as amplifiers and automatic gain controllers, all of which are well known to one of ordinary skill in the art.

A simplification of the embodiment shown in FIG. 2 is possible if the combiner 18, optical transmitter 19, photodetector 20, and splitter 22 are all able to handle signals at the intermediate frequency $f_i=f_1-f_{LO}$, as well as signals at the RF frequency of the main and diversity signal. Then the mixer 44 and filter 46 are not required, because instead of transmitting the signal $f_1'-2f_i'$, the device can simply transmit the signal $f_i'$. On the destination side, the filter 52 and mixer 56 can be eliminated and the signal $f_i'$ can be provided directly to filter 59.

Both FIG. 1 and FIG. 2 can be understood to depict that the present invention includes a first, packaging means and a second, un-packaging means. The packaging means uses an oscillator signal to separate in frequency the two arriving signals and to create a single, combined signal that includes the oscillator signal. The combined signal is conveyed by the single transmission medium to the un-packaging means, which extracts from the combined signal the two arriving signals and un-shifts one or more of the two arriving signals so that both are again at the original, same center frequency. Because the un-packaging means extracts from the combined signal the same oscillator signal used by the packaging means, the un-shifting by the un-packaging means is performed precisely, avoiding distortion.

It is to be understood that the above-described arrangements are only illustrative of the application of the principles of the present invention. In particular, it is clear from the symmetry of FIG. 2 that the present invention can be used with equal advantage whether two signals of a same center frequency are being communicated to a receiver from a remote antenna, or are being communicated from a transmitter to a remote antenna. Numerous other modifications and alternative arrangements may be devised by those skilled in the art without departing from the spirit and scope of the present invention, and the appended claims are intended to cover such modifications and arrangements.

What is claimed is:

1. An apparatus for simultaneously communicating over a single transmission medium two simultaneously arriving signals of substantially a same center frequency using a local oscillator signal provided by an oscillator, comprising:
   a) packaging means, responsive to the two arriving signals, for shifting in frequency one of the two arriving signals based on the local oscillator signal, for providing as a combined signal to the transmission medium the shifted arriving signal, the other arriving signal, and the local oscillator signal; and
   b) un-packaging means, responsive to the combined signal, for extracting in turn the local oscillator signal, the shifted arriving signal, and the other arriving signal, and for shifting back to the center frequency the shifted arriving signal based on the extracted oscillator signal to produce an un-shifted arriving signal, for providing the other arriving signal and the un-shifted arriving signal.

2. An apparatus as claimed in claim 1, wherein the transmission medium is an optical fiber.

3. An apparatus as claimed in claim 2, wherein the center frequency is a radio frequency.

4. An apparatus as claimed in claim 3, wherein the packaging means comprises:
   a) a mixer, responsive to one of the arriving signals and to the local oscillator signal, for providing a signal that is a multiplication of the local oscillator signal and the arriving signal, for providing as output a signal with a frequency component at a shifted frequency, the shifted frequency equal to the center frequency less the frequency of the oscillator signal;
   b) a filter, responsive to the output of the mixer, tuned to the shifted frequency, for providing the shifted arriving signal; and
   c) a combiner, responsive to the oscillator signal, the shifted arriving signal, and the other arriving signal, for providing a combined signal.

5. An apparatus as claimed in claim 4, wherein the un-packaging means comprises:
   a) a splitter, responsive to the combined signal, for providing the combined signal at three splitter outputs;
   b) a bandpass filter substantially tuned to the center frequency, responsive to the combined signal provided at one of the splitter outputs, for providing the other arriving signal;
   c) a bandpass filter substantially tuned to the mixing frequency, responsive to the combined signal provided at one of the splitter outputs, for providing the oscillator signal;
   d) a bandpass filter substantially tuned to the shifted frequency, responsive to the combined signal provided at one of the splitter outputs, for providing the shifted arriving signal;
   e) a mixer, responsive to the filtered shifted signal and to the local oscillator signal, for providing a signal having a component with a frequency equal to the original, center frequency; and
   f) a bandpass filter substantially tuned to the center frequency, responsive to the local oscillator signal, for providing the un-shifted arriving signal.

6. An apparatus for simultaneously communicating over a single transmission medium two simultaneously arriving signals of substantially a same center frequency using a local oscillator signal provided by an oscillator, comprising:
   a) a source of a local oscillator signal at a mixing frequency;
   b) means for shifting in frequency one of the two arriving signals by an amount depending on the mixing frequency, for providing a shifted signal;
   c) means for combining the local oscillator signal, the shifted signal, and the other arriving signal, for providing a combined signal for communication over the transmission medium;
   d) means responsive to the transmitted combined signal, for providing three samples of the transmitted combined signal;
   e) means for extracting the local oscillator signal from one of the samples of the transmitted combined signal;
   f) means for extracting the shifted signal from another of the samples of the transmitted combined signal;
   g) means for shifting in frequency the extracted shifted signal back to the center frequency using the extracted local oscillator signal, for providing an un-shifted signal; and
   h) means for extracting the other arriving signal from another of the samples of the transmitted combined signal.

7. An apparatus as claimed in claim 6, wherein the transmission medium is an optical fiber.

8. An apparatus as claimed in claim 7, wherein the center frequency is a radio frequency.

* * * * *